United States Patent [19]

Atwell

[11] Patent Number: 4,526,801
[45] Date of Patent: Jul. 2, 1985

[54] REFRIGERATED DOUGH

[75] Inventor: William A. Atwell, Spring Lake Park, Minn.

[73] Assignee: The Pillsbury Company, Minneapolis, Minn.

[21] Appl. No.: 518,892

[22] Filed: Aug. 1, 1983

[51] Int. Cl.$^3$ .............................................. A21D 2/00
[52] U.S. Cl. .................................... 426/128; 426/551; 426/561
[58] Field of Search ......................... 426/549, 551–555, 426/532, 324, 326, 335, 94, 128

[56] References Cited

U.S. PATENT DOCUMENTS 3,208,855  9/1965  Enoch et al. ......................... 426/549
3,222,189  12/1965  Perrozzi .............................. 426/549
3,784,710  1/1974  Earle .................................... 426/532
4,381,315  4/1983  Yong et al. ......................... 426/128

Primary Examiner—Robert Yoncoskie
Assistant Examiner—Elizabeth A. King
Attorney, Agent, or Firm—Robert J. Lewis; Michael D. Ellwein

[57] ABSTRACT

A refrigerated dough is provided which contains a volatilizable edible substance having a vaporization temperature of less than about 200° F. and a packed specific volume of greater than about 1.25 cc/gm. The dough provides higher specific volumes upon baking. The dough is at least partially chemically leavened and is adapted for containment in a container for storage under refrigerated conditions.

18 Claims, 4 Drawing Figures

REFRIGERATED DOUGH

BACKGROUND OF THE INVENTION

Refrigerated dough or fresh dough, i.e., dough contained in a container and sold out of the refrigerated case at the grocery store, has long been a popular item. Typically, the dough is chemically leavened and formulated for storage in containers which will maintain the pressure generated by the leavening action of the leaveners in the dough. All a cook need do to prepare biscuits or the like from the contained dough is to open the container and place the dough in the oven and bake.

One problem attendant with such products is low baked specific volume, a typical average value of which is about 3.7 cc/gm. In the case of Pipin' Hot brand loaf as described in U.S. Pat. No. 4,381,315 a typical baked specific volume is about 4.2 cc/gm. The disclosure of this patent is incorporated herein by reference. Additional leavening agents can be added to improve specific volume but can lead to excessive can pressure during storage and/or they can cause taste problems particularly with phosphate leaveners.

The present invention provides by a simple expedient a means for providing higher specific volume in the baked product.

In chemically leavened (Willoughby) dough system there has been known for a number of years a relationship between baked specific volume and packed dough specific volume. This general relationship is shown in the "without ethanol" line of FIG. 1. An increase in packed specific volume resulted in a decrease in baked specific volume. Since high specific volume baked products are desirable those skilled in this art have avoided using increased packed specific volumes because of the decrease in baked specific volume. Until this invention no one has been able to change this relationship and have used low packed specific volumes on the order of about 1.15 cc/gm in the container. Pipin' Hot brand loaf currently being sold has a target packed specific volume of 1.18 cc/gm.

High baked specific volumes are desirable and solutions have been proposed but have resulted in product negatives. Thus, there has been a long felt need in the industry but no solution has been achieved until the present invention. One proposed solution was higher levels of leavening, but this resulted in higher can pressures and the attendant problems of can blow up and more chemical taste. Further, the industry tried to keep the packed specific volume as low as possible but this could also increase can pressure and its problems.

A seemingly impossible problem has faced the industry and all attempts at solutions have met with little if any success. The present invention was the result of going in a direction directly opposite to what the art taught. Baked specific volumes of 5 cc/gm or higher were achieved with the invention. It was also found that baked specific volumes equal to that achieved in prior dough systems could be achieved with significantly lower can pressures a significant benefit when baked specific volume can be lower. It was unexpectedly found that by adding a volatilizable substance into a chemically leavened dough formulation and increasing the specific volume of the packed dough (contrary to the prior art) that significantly higher specific volume in the baked product could be achieved. As seen in the "with ethanol" line in FIG. 1 this combination resulted in a reversal of the prior art relationship between baked and packed specific volumes. Also, when the volatilizable substance is edible alcohol it provides upon baking, a pleasing aroma similar to that of a yeast-leavened product.

OBJECTS OF THE PRESENT INVENTION

An object of the present invention is to provide an improved chemically-leavened fresh dough product which upon baking results in a higher specific volume.

Another object of the present invention is to provide an improved chemically-leavened fresh dough product which can have reduced container pressures and still have acceptable baked specific volume.

Other objects and advantages of the present invention will become apparent from the following detailed description taken in connection with the accompanying drawings wherein are set forth by way of illustration and example certain embodiments of the present invention.

DETAILED DESCRIPTION OF THE INVENTION

In the manufacture of refrigerated dough of the Willoughby type the chemically leavened dough is prepared such as hereinafter described and is placed in a container. After being placed in the container and the container is closed, the dough is allowed to rise by the leavening action of the leavener and the container becomes pressurized. The container is stored in a refrigerated condition typically at a temperature of about 40° F. The consumer then simply has to open the container, remove the dough and bake the product providing great convenience for the consumer.

However, one of the problems with such a system is specific volume of the baked product. Consumers desire a high specific volume particularly when making a bread like item. Manufacturers would also like to have lower pressure containers. These problems have plagued the industry for many years as is attested to by the numerous patents which address the issue of specific volume and various means to improve it but no realistic solution has been found. A co-pending application Ser. No. 262,586 used the addition of an edible alcohol to improve specific volume which worked reasonably well and further provided the advantage of a pleasing aroma during baking. In the prior art numerous parameters have been adjusted in order to improve baked specific volume, none of which have been very successful in making any significant change in specific volume while still maintaining quality.

Figure 1:
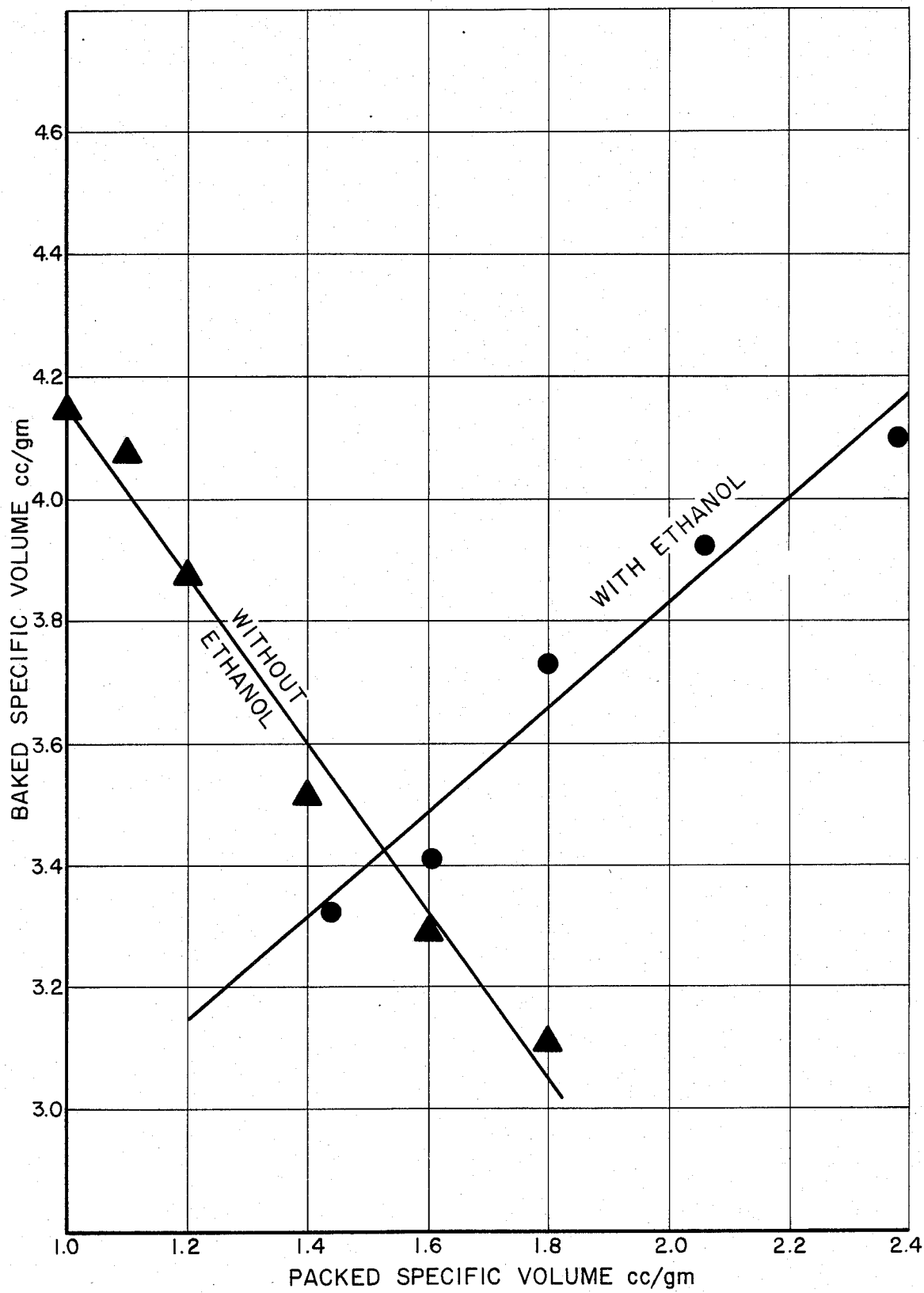
FIG. 1 is a graph showing functional relationships between baked specific volumes and packed specific volumes with (2% level) and without ethanol.

FIG. 1 shows a relationship between baked specific volume and specific volume of the dough as packed (packed specific volume) in the can with the can being in its proofed and filled condition. Typically in the industry this specific volume value has been less than 1.15 cc/gm as proofed and packed. It is clear from FIG. 1 that an increase in the dough's packed specific volume (i.e., as packed and proofed in the can) causes a substantial decrease in baked specific volume when no volatilizable substance (as hereinafter described) is present. This is a well known relationship and no solution to this decline in baked specific volume with increase in packed specific volume had been found prior to this invention.

Figure 2:
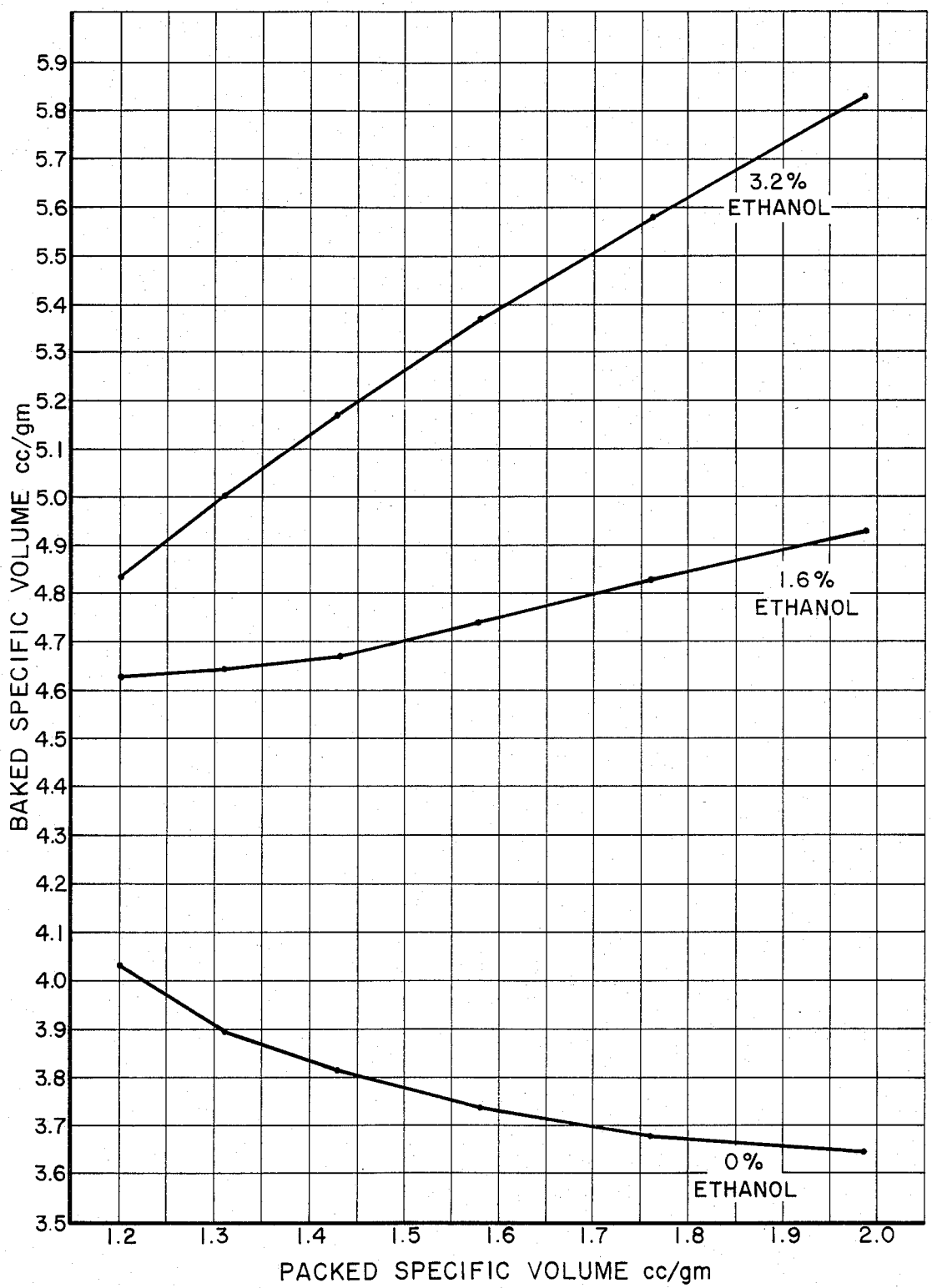
FIG. 2 is a graph showing fuunctional relationships between baked specific volumes and packed specific volumes at varying levels of ethanol.
Figure 3:
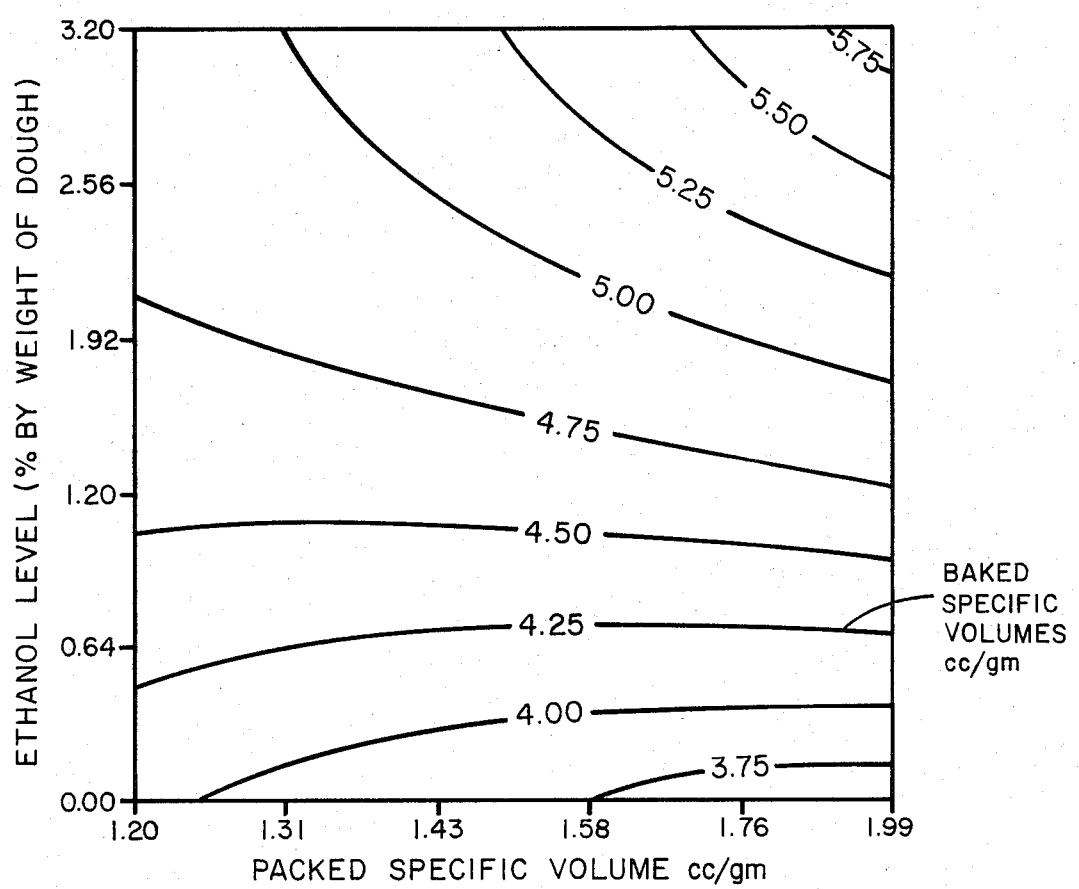
FIG. 3 is a graph showing functional relationships between packed specific volume and ethanol level at constant baked specific volumes. The graph is computer generated from the data of FIG. 2.

It has now been found that by adding to the dough a volatilizable edible substance, preferably liquid, (hereinafter volatilizable liquid) having a vaporization temperature of less than about 200° F. (93.3° C.) preferably less than about 190° F. (87.8° C.) and most preferably less than about 180° F. (82.2° C.) and by increasing the specific volume of the packed and proofed dough to a value above about 1.25 cc/gm preferably above about 1.35 cc/gm and most preferably above about 1.45 cc/gm it was found that there was no longer a decrease in baked specific volume with an increase in baked specific volume of the dough but an increase in baked specific volume or equal baked specific volumes could be achieved with lower can pressures. This is shown clearly in FIG. 1. Further, the more volatilizable liquid that is added, the steeper the slope of the increase in baked specific volume with an increase in packed dough specific volume as illustrated in FIGS. 2 and 3.

Figure 4:
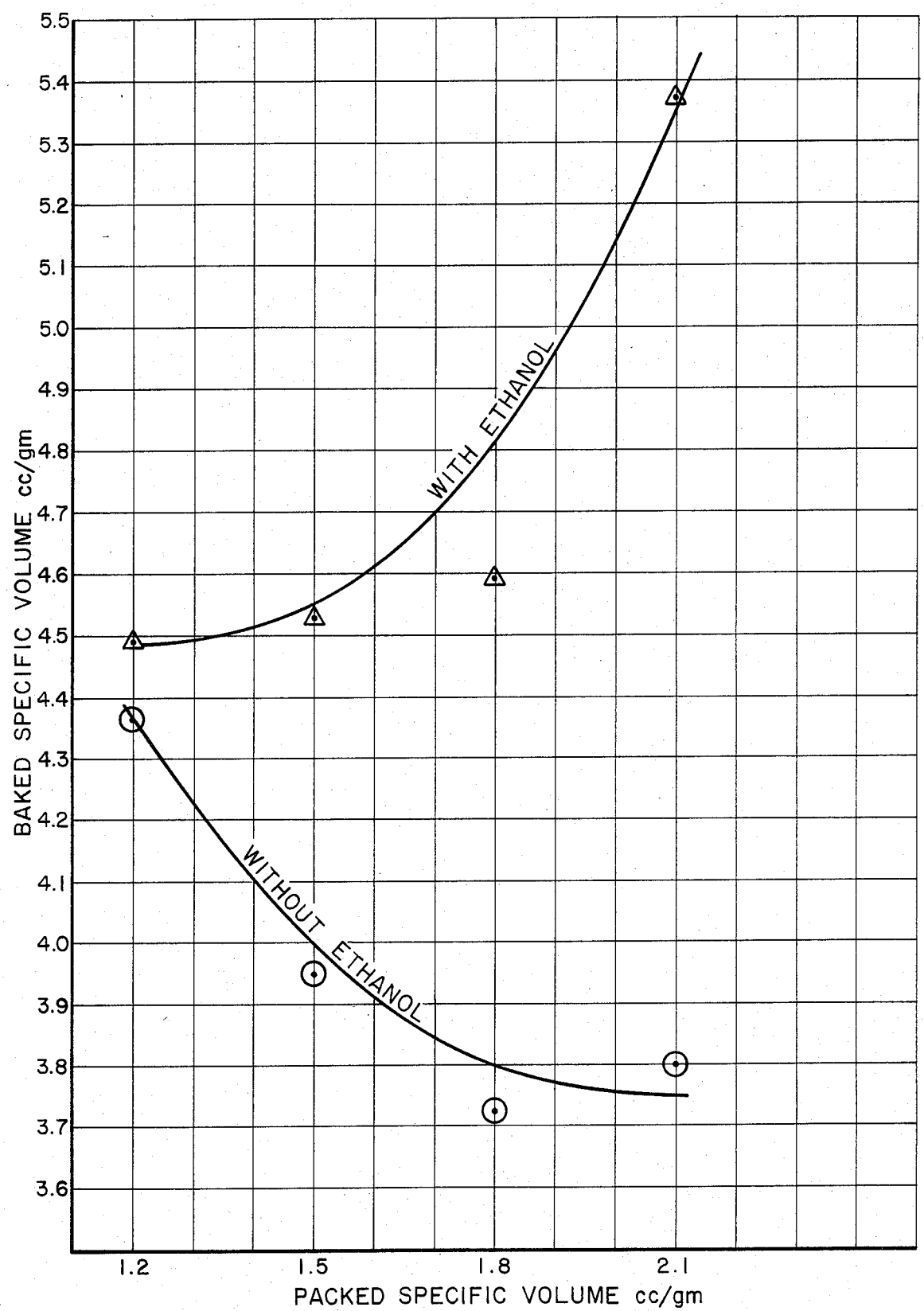
FIG. 4 is a graph similar to FIG. 1 (ethanol is at a 2% level).

Preferred volatilizable edible liquids are edible alcohols with the most preferred being ethanol. Ethanol is currently being added to Pipin' Hot brand loaf as described in U.S. Pat. No. 4,381,315 and the packed specific volume of the dough is 1.18 cc/gm. With reference to FIG. 4, at different levels of packed specific volume of less than 1.2 cc/gm there is generally no change in baked specific volume. This means that on baking doughs of this type operating in the normal ranges, up to 1.18 cc/gm, of packed specific volume one would see no increase in baked specific volume until the dough specific volume exceeds about 1.25 cc/gm. Therefore, at low packed specific volumes the change in baked specific, if any, is not adequate to provide any direction to use higher baked specific volumes. Greater increases in baked specific volume are apparent at packed specific volumes above 1.35 cc/gm and 1.45 cc/gm. Without the volatilizable liquid, as seen in FIGS. 1 and 4, for the same dough system except for the lack of a volatilizable liquid, an increase in dough specific volume results in a decrease in baked specific volume.

The amount of volatilizable liquid needed is dependent on the ability of the dough to retain gas. The following values are based on the dough in the container retaining 15% of the gas generated by the volatilizable liquid. The amount of volatilizable liquid used will change if the gas retention value is changed. The volatilizable liquid is present in an amount sufficient to produce at least about $6.5 \times 10^{-5}$ moles of gas per gram of dough in the container, preferably at least about $1.1 \times 10^{-4}$ moles of gas per gram of dough and most preferably at least about $2.2 \times 10^{-4}$ moles of gas per gram of dough at a gas retention value of 15%.

If the dough can retain more or less gas than the 15% level then the amount of volatilizable substance would be adjusted and the stated values of volatilizable liquid quantity will change according to a linear relationship.

When liquids are used as the volatilizable substance it is prefered that the liquid be present in an amount above about 0.3%, preferably above about 0.5% and more preferably above about 1% by weight of dough in the container (based on a 15% gas retention value). When the volatilizable liquid is alcohol the percents by weight are based on pure 100% alcohol.

There are several ways to vary the packed specific volume and the results of these different ways of changing dough specific volume. For example, packed specific volume can be changed by changing the length of and/or the diameter of a can holding all other parameters constant, e.g., dough weight, dough formula etc. Packed specific volume can also be changed by changing the pack weight of the dough in a container. However, a very large diameter container can reduce the effect of the invention on baked specific volume probably due to heat transfer changes.

In practicing the present invention, the use of the chemical leaveners as described hereinafter particularly the blander leaveners which are faster acting may not be as difficult as they were prior to this invention. That is, the criticality of line time would become less critical because contrary to the prior art which avoided having high specific volume dough in the can because of the resulting decrease in specific volume one would, by practicing the present invention, prefer to have a higher specific volume dough in the can. However, the preferred mode currently is to utilize a system as hereinafter described in combination with a volatilizable liquid and a higher specific volume for the packed dough.

By practicing the present invention baked specific volume as high as 5.5 cc/gm can be consistently achieved in an extremely reliable manner. As an alternative, less leavening could be used to achieve the same specific volume as in current systems thereby reducing the need for leavening components which could alleviate some of the problems exhibited in phosphate leavened systems as opposed to the blander leavened systems such as a GDL system.

In the present invention, chemically leavened formula have been developed which provide good results. (The formula need not be totally chemically leavened.) The dough is self supporting and pliant. The fresh dough formula is a farinaceous flour-based formula and contains flour, water, shortening, chemical leaveners, sugars, salt, edible alcohol (e.g. ethanol) and may also contain emulsifiers, dough conditioners (such as potassium bromate or ascorbic acid), flavoring materials (such as yeast flavor) and/or may contain other ingredients as known in the art.

The following is a description of the commercially available Pipin' Hot brand loaf and the preferred method of its manufacture. It is currently contemplated that this invention will be practiced using this teaching which is also disclosed in U.S. Pat. No. 4,381,315.

The following tabulation provides preferred formulation contents.

| Ingredient (Approx.) | Range % | Preferred % for Bread (Approximate) |
| --- | --- | --- |
| Wheat Flour (hard preferred for bread) | 47–58 | 52–56 |
| Water | 28–36.5 | 28–36 |
| Saccharides | 4–10 | 4–8 |
| Salt | 1.0–1.5 | 1–1.5 |
| Flavoring | 0.1–7 | 2–7 |
| Emulsifiers | 0.02–1.1 | 0.02–0.3 |
| Dough Conditioners | 0.004–.25 | 0.005–0.02 |
| Bicarbonate of Soda | 0.7–1.2 | 0.7–1.2 |
| Leavening Acid | 1.3–2.5 | 1.3–2.5 |
| Shortening | 2–25 | 3–6 |
| Edible Alcohol | 0–2 | 0–2 |

| Ingredient (Approx.) | Range % | Preferred % for Bread (Approximate) |
|---|---|---|
| Calcium Carbonate | 0–1 | 0–1 |

Proportions are by weight of dough.

Problems to date with selecting a leavener is that the blander leaveners are faster acting which made them impractical or impossible to use on line because too much rise occurs during on-line processing which adversely affected packing density and physical packing of the fresh dough into a container as well as specific volume in the baked product. Further, the use of slower-acting phosphate leaveners could result in an off taste which is objectionable to consumers. The present invention now permits the use of high pack specific volumes with improved baked specific volume alleviating line time critically.

Even in view of their shortcomings, it is desired to use chemical leavening because of the control one can achieve and because of the reduced leavening time and pressure stability during storage required over the use of yeast as the leavener. The selection of one type of leavener over another type resulted in the sacrifice of either flavor or line time. The term chemical leavener, as used herein, includes the reactive acid plus base systems, added $CO_2$ or any means, method or substance capable of adding $CO_2$ to the dough other than yeast. $CO_2$ can be added directly by pressure, mixing etc. Carbonated water could also be a leavener. By use of the invention, organic acid leaveneners which are relatively bland (and are fast acting, e.g. citric acid, glucono delta lactone (GDL), fumaric acid or any other organic acid can be effectively used. Also, the non-bland leaveners (e.g. phosphate based) can also be used as can any chemical leavener. For improved performance of the dough during baking, it is desirable to pack the product into the can with at least 0.35% by weight of dough unreacted soda as one of the leaveners.

In order to use the preferred leaveners, the method of incorporating the particular leavener into the dough is of importance because of the fast reaction time of the blander leaveners. Surprisingly, it has been found that not mixing the leaveners into the flour/water matrix, but keeping the leavener substantially isolated therefrom, provides good line time characteristics and also does not adversely affect the baked product's specific volume. It is preferred that one or both leaveners be introduced into the dough system such that it is in contact with the flour/water matrix and/or shortening. Both the flour/water matrix and shortening can be considered continuous phases in the dough system and as separate components.

In order for the leaveners to produce leavening gas the leavening acid and leavening base are in reactive contact. In present chemically leavened dough systems the acid and base need to be solubilized in water for the reaction to occur. Thus, to prevent the reaction it has been found that by keeping at least one of the required materials for the reaction isolated from the remainder that the reaction will not take place. However, by keeping them isolated in certain manners the reaction can be delayed and not totally inhibited. What is meant by substantially isolated is that at least one or more of the required materials for reaction is kept isolated from the remainder in such a manner that after sheeting is completed that at least about 40% of the acid and base are unreacted and preferably at least about 50% and most preferably in the range of between about 60% and about 85% is unreacted.

The following methods are operable to achieve substantial isolation.

Two methods of incorporating the leavener can be done when forming a laminated dough, which is the preferred embodiment of the present invention, such as, for example, by sheeting on a Rheon stretcher or conventional rollstand. This will form alternating layers of flour/water matrix and shortening.

The number of layers of shortening interspersed within the flour/water matrix can vary from 4 to 1000—the preferred number of layers will be dependent upon the final thickness of the dough sheet. The shortening layers can vary from about 0.001 mm to about 0.040 mm, more preferably from about 0.001 mm to about 0.020 mm and most preferably from about 0.001 mm to about 0.010 mm in thickness. Flour/water matrix layers can vary from about 0.010 mm to about 0.750 mm, more preferably from about 0.020 mm to about 0.550 mm and most preferably, from about 0.030 mm to about 0.450 mm in calculated thickness. Very thin layers of both shortening and dough are not desirable because the leaveners react too quickly, decreasing the density of the dough to the point where it is difficult to pack into the can under existing methods. The thicknesses are determined by calculation given the quantity of shortening or flour/water matrix, the number of layers and they area of the layers and is an average thickness. Very thick layers of shortening and flour/water matrix are also not desirable because the leaveners remain encapsulated in the shortening through the shelf life of the product and do not react with the dough layers to provide the desired leavening action. Additionally, the presence of unreacted leaveners in the product during baking results in large voids and/or unsightly brown areas within the baked crumb and, the unleavened dough layers form dense, gummy rings in the baked crumb.

When using a lamination process the leavener can be incorporated by sprinkling one or both of the leaveners into the shortening after it is applied to a surface of the flour/water matrix and prior to laminating the shortening and leavener into the dough. During lamination, it is preferred that the dough mass be sheeted which can be accomplished by the use of the Rheon machine or conventional roll stands, in effect finely dispersing the leavener and shortening into the dough matrix.

Another method of incorporating the leaveners in a lamination process is to mix one or both of the leaveners with the shortening prior to distributing the shortening onto the surface of the flour/water matrix. The dough is then subsequently laminated in a typical manner. Of the methods of incorporation disclosed herein, the preferred embodiment is mixing the leaveners into the shortening prior to lamination. This gives the longest line time and thus, faster acting leaveners could be used in the existing methods.

Another method of incorporating leaveners which can be used in processes which can include or not include lamination is to mix one or both of the leaveners with the shortening prior to mixing the shortening into the flour and water. Dough mixing is completed in the usual manner except that shortly (about 1–3 minutes) before the completion of mixing, a shortening/leavener mixture or leaveners alone are added to the dough. The very short mixing time allows distribution of the leaveners and shortening through the dough, but is inadequate to blend these ingredients thoroughly into the flour/water matrix and substantially prevent contact of the leavener with the flour/water matrix. The dough can then be subsequently sheeted and folded in a typical manner to complete the dispersion of the shortening and leaveners in the flour/water matrix.

A still further method of incorporating leaveners is to sprinkle one or both of the leaveners onto the flour/water matrix or dough after forming the flour/water matrix and prior to placing the dough into a container. This can be done without or with laminated doughs. Preferably the leavener(s) is sprinkled on the flour/water matrix duing or after sheeting or just prior to the end of the sheeting process. If the dough is laminated the sprinkling is preferably done after lamination is complete. In this method the shortening can be incorporated in the flour/water mixing step or by lamination or a combination of both.

It is to be noted that combinations of the above methods of incorporation can also be used.

The texture of the finished product is an important attribute for consumer acceptance. It has been found that by the use of lamination of the dough, the texture of baked products can be improved. This was surprising since lamination is used to tenderize and/or form noticeable layers in finished bakery products e.g. Danish. By laminating as described above such that shortening and flour/water matrix are interspersed in layers, the baked product exhibits greater resiliency, little if any noticeable layering and has a more bread like cell structure. After lamination, the dough is prepared for insertion into the can. The dough can be sheeted to a final pad thickness of 2–10 mm, cut, and the dough pad is then misted with a water based spray and rolled or otherwise formed into a cylinder. The water spray prior to rolling facilitates mending of the texture of the dough and eliminates a rolled appearance in the final loaf.

Alternatively, the dough can be sheeted to 30–50 mm thickness, the final thickness varying with can size, and the dough is cut to an appropriate width to allow insertion into the can.

After proofing, the container, which can be a traditional helically wound container or a flexible plastic chub, should have a gauge pressure of at least about 2 psi preferably at least about 5 psi and most preferably at least about 7 psi at its refrigerated storage temperature of about 40° F. (4.4° C.).

As lamination is the preferred mode of this invention for producing bread like texture, the selection of shortening is important. Preferably the laminating shortening is present in an amount of less than about 10% more preferably less than about 8% and most preferably between about 2% and about 6% by weight of dough for laminated dough. A particularly good shortening for laminated dough has been a soybean/tallow blend available as a blended oil from Humko (#EXP 106-3) and votated as known in the art. Typically, in the selection of a shortening, one would want to select a shortening on the basis of solids fat index and suitable plasticity.

the following chart shows possible solids ranges at various temperatures for laminated shortenings.

| Temp. °F. | Acceptable | | More Preferably | | Most Preferably | |
| --- | --- | --- | --- | --- | --- | --- |
| 50 | 36 | 60 | 40 | 58 | 46 | 56 |
| 70 | 23 | 55 | 26 | 53 | 36 | 51 |
| 80 | 21 | 52 | 24 | 50 | 32 | 48 |

-continued

| Temp. °F. | Acceptable | | More Preferably | | Most Preferably | |
| --- | --- | --- | --- | --- | --- | --- |
| 92 | 14 | 42 | 15 | 40 | 20 | 35 |
| 100 | 10 | 31 | 12 | 30 | 15 | 26 |
| 104 | 2 | 22 | 8 | 20 | 12 | 20 |

Yeast flavor can be added to the dough to enhance the aroma and taste of the end product. Typically, yeast flavor can be added by addition of a compounded flavor or utilization of a pasteurized yeast brew to replace all or some of the dough water.

The carbon dioxide generated by the reaction of the leavening acid and base within the dough is retained in the form of minute gas sites. This is functionally important because uniform dispersion of the carbon dioxide (small gas sites versus large gas sites) throughout the dough product supplements the alcohol in reducing subsequent microbial growth and in providing a suitable finished baked volume.

The amount of monosaccharides contained in the dough composition may be above about 0.15%, preferably above about 0.24% by weight of dough. Any of a variety of edible commercially available monosaccharides can be used including glucose (dextrose), galactose, mannose and fructose (levulose). Other monosaccharides can, of course, be used if commercially available, including monosaccharides such as erythrose, arabinose, xylose, ribose, lyxose, gluose, idose, talose, altrose, allose, sorbose and tagatose.

It is understood that while there has been illustrated and described certain forms of the present invention, it is not to be limited to the specific form or arrangement of part herein described and shown except to the extent that such limitations are found in the appended claims.

What is claimed and desired to be secured by Letters Patent is:

1. A fresh dough product contained in a container and being at least partially chemically leavened, said dough product including wheat flour, water, and chemical leaveners in amounts adequate to form a dough adapted for making bread like items, said dough product including:
a volatilizable edible substance having a vaporization temperature of less than about 200° F. in an amount sufficient to produce at least about $6.5 \times 10^{-5}$ moles of gas per gram of dough, in the container based on a 15% gas retention value, and said dough having a packed specific volume in the container above about 1.25 cc/gm.

2. A fresh dough product as set forth in claim 1 wherein said volatilizable substance is present in an amount sufficient to produce at least about $1.1 \times 10^{-4}$ moles of gas per gram of dough, in the container based on a 15% gas retention value.

3. A fresh dough product as set forth in claim 1 wherein said volatilizable substance is present in an amount sufficient to produce at least about $2.2 \times 10^{-4}$ moles of gas per gram of dough in the container based on a 15% gas retention value.

4. A fresh dough product as set forth in claims 1, 2 or 3 wherein said volatilizable substance is liquid.

5. A fresh dough product as set forth in claim 4 wherein said volatilizable substance is an edible alcohol.

6. A fresh dough product as set forth in claim 1, 2 or 3 wherein said packed specific volume is above about 1.35 cc/gm.

7. A fresh dough product as set forth in claims 1, 2 or 3 wherein said packed specific volume is above about 1.45 cc/gm.

8. A fresh dough product as set forth in claim 5 wherein said packed specific volume is above about 1.35 cc/gm.

9. A fresh dough as set forth in claim 8 wherein said packed specific volume is above about 1.45 cc/gm.

10. A fresh dough product contained in a container and being at least partially chemically leavened, said dough product including wheat flour, water, and chemical leaveners in amounts adequate to form a dough adapted for making bread like items, said dough product including:
   a volatilizable liquid having a vaporization temperature of less than about 200° F. present in an amount above about 0.3% by weight of dough, in the container based on a 15% gas retention value, and said dough having a packed specific volume in the container above about 1.25 cc/gm.

11. A fresh dough product as set forth in claim 10 wherein said volatilizable liquid is present in an amount above about 0.5% by weight of dough in the container based on a 15% gas retention value.

12. A fresh dough product as set forth in claim 10 wherein said volatilizable liquid is present in an amount above about 1% by weight of dough in the container based on the 15% gas retention value.

13. A fresh dough product as set forth in claim 10, 11 or 12 wherein said volatilizable liquid is an edible alcohol.

14. A fresh dough product as set forth in claim 13 wherein said edible alcohol is ethanol.

15. A fresh dough is set forth in claim 10, 11 or 12 wherein said packed specific volume is above about 1.35 cc/gm.

16. A fresh dough product as set forth in claim 10, 11 or 12 wherein said packed specific volume is above about 1.45 cc/gm.

17. A fresh dough product as set forth in claim 14 wherein said packed specific volume is above about 1.35 cc/gm.

18. A fresh dough as set forth in claim 14 wherein said packed specific volume is above about 1.45 cc/gm.

* * * * *